(No Model.)
J. W. CONDRY.
AUTOMATIC GATE.
No. 368,815. Patented Aug. 23, 1887.
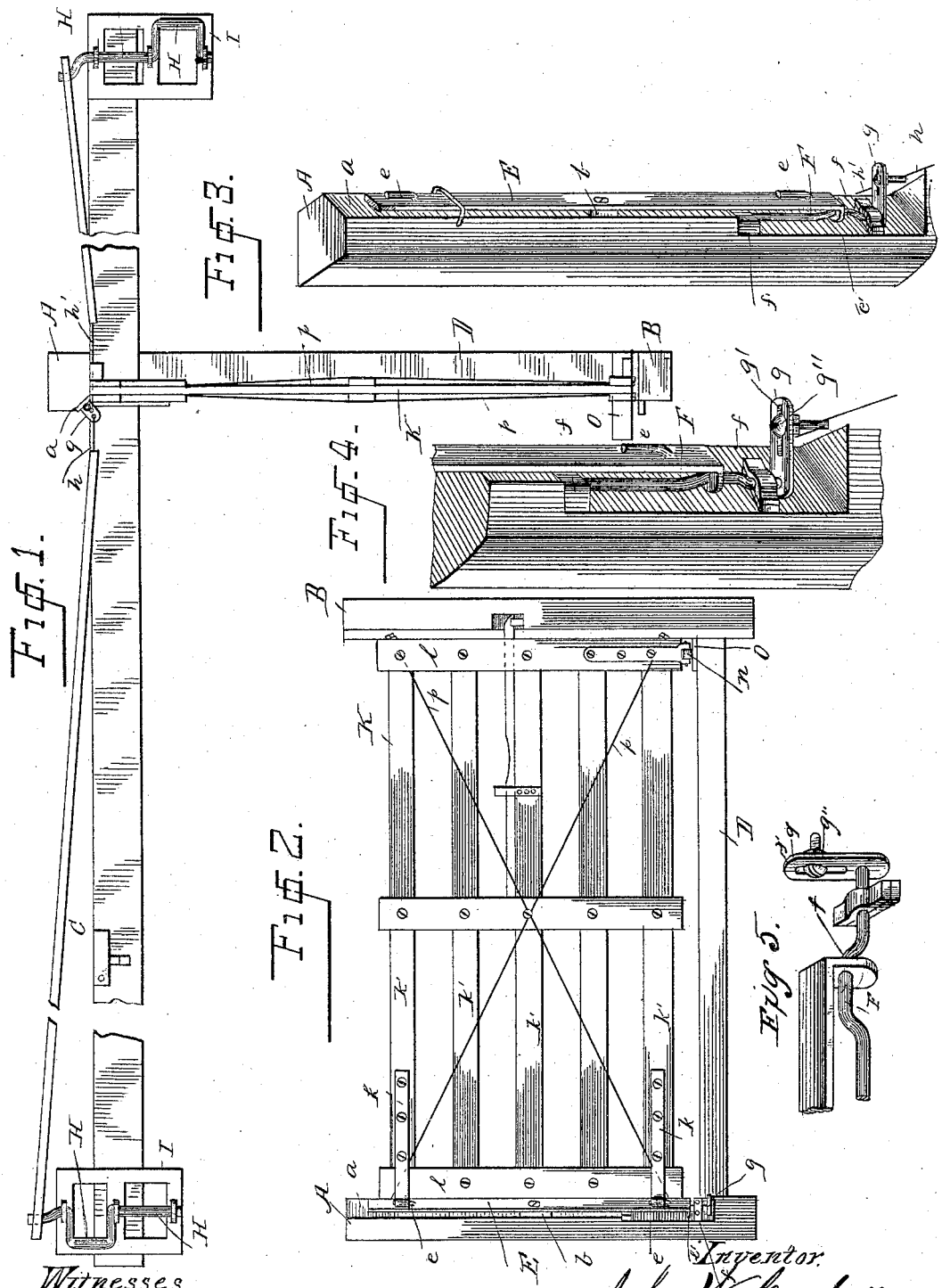

UNITED STATES PATENT OFFICE.

JOHN W. CONDRY, OF BUCKEYSTOWN, MARYLAND.

AUTOMATIC GATE.

SPECIFICATION forming part of Letters Patent No. 368,815, dated August 23, 1887.

Application filed February 23, 1887. Serial No. 228,598. (No model.)

*To all whom it may concern:*

Be it known that I, JOHN W. CONDRY, of Buckeystown, in the county of Frederick and State of Maryland, have invented certain new and useful Improvements in Automatic Gates; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to improvements in automatic gates, or that class of gates which are opened and closed by a tilting mechanism and by the vehicle-wheels passing over trip-rods; and the objects of my invention are, first, to construct an automatic gate of few parts and having those parts made of strong durable material, and so arranged as to be operated by the wheels of a vehicle passing over trip-rod; second, to hang the gate on pintles secured to a lever pivoted to the inner post and adapted to be operated by the trip-rods and connecting mechanism, whereby the gate will be tilted to one side, and thus allowed to swing open, or, when open, to close, and the gate, for its more perfect and accurate operation, shall stand, when closed or open, in a horizontal and vertical position, or as nearly so as possible; third, to construct a gate of light but strong material, and having brace rods or wires extending from the top of one stile to the lower end of the opposite stile, and vice versa, the wires or rods being placed on each side of the gate and having their ends screw-threaded to receive nuts and washers, whereby the gate can, when it is found necessary, be tightened up, and thus prevented from sagging, &c.; and it consists in certain details of construction and combination of parts, as will be hereinafter more fully described, and specifically pointed out in the claims. I attain these objects by the mechanism illustrated in the accompanying drawings, in which—

Figure 1 is a plan view of my improved automatic gate. Fig. 2 is a front elevation showing the gate closed. Fig. 3 is a perspective view of the main post, showing the pivoted lever and operating-cam and attachment; and Fig. 4 is an enlarged detail view of a portion of the lever, showing, also, the crank and cam. Fig. 5 is an enlarged detail view of the operating-crank.

Similar letters refer to similar parts throughout the several views.

In the drawings, A represents the main post, to which the gate and operating mechanism is hinged and pivoted. B represents the opposite post for the gate to latch and shut on, and C is also a post for the gate to latch on when open. The said posts are set in the ground in the usual manner, or may be set in a bed of concrete, or the like, for the purpose of more securely holding the same in position and preventing rot.

D is a cross-beam set in the ground, and extends across the road-bed from the post A to the post B. The cross-beam D, however, can be dispensed with.

The post A has a beveled edge, $a$, on one side, as clearly shown, to which is pivoted near the center an operating-lever, E, and between the lever and the beveled edge is a washer, $b$, the purpose of which is to reduce the amount of friction, thereby allowing the gate to be more easily operated. To the lower and upper portion of the lever I secure pintles $e\ e$, to be further described.

The lever E at its lower end is turned inwardly at right angles, as shown at $e'$, to form a short piece, through which a hole or perforation is made for the reception of a crank, F, journaled to the beveled side of the post A by suitable plates, $f\ f$, forming journals or bearings, the end of the crank, to which is firmly secured an arm, $g$, extending below its lower bearing. In the end of the arm $g$, I form a longitudinal slot, $g'$, in which is adapted to slide a bolt and nut, $g''$, the lower portion of the bolt extending a short distance below the nut, and in this portion are perforations, in which the ends of the wires or rods $h\ h'$ are secured, the purpose of which is to adjust the tilting of the gate. When the bolt is secured in the front end of the slot, it will not tilt the gate over as far as it would were the bolt secured at the rear portion of the slot. The wire or rods $h\ h'$, after being secured to the bolt, extend along the side of the road in each direction for a suitable distance, and then are pivotally secured to the double-acting trip-rods H H, suitably placed and secured in frames or beds I I, placed in the ground and on a level with the road-bed. The rods or wires, to more securely guard them from injury, may, if desired, be passed through pipes or troughs constructed for the purpose. To prevent them from becoming injured by the wheels of a vehicle or otherwise, I place them at an angle back of the main road, as will be clearly seen in the drawings. The gate K is hung by strap-hinges k k to the pintles e e, before described, the gate being constructed, preferably, of the horizontal strips k' k' k', secured between the upright strengthening-pieces l l l, placed on each side of the pieces k' k'. Extending from the top of one upright to the lower end of the opposite one, and vice versa, and on each side of the gate, are the braces or strengthening wires or rods p p, their ends extending beyond the uprights and terminating in screw-threaded ends adapted to receiver washer and nuts, the purpose of which is that when found necessary the wires may be drawn taut, thus preventing the gate from sagging or becoming shaky. To the lower end of the uprights, and opposite the hinge portion, I suitably secure a wheel or roller, n, which, when the gate is being opened or closed, is adapted to ride upon the short inclined pieces o, secured to the crosspiece or posts, the purpose of which is that, whether the gate is opened or closed, the wheel may support that end of the gate. I also secure to the gate the usual latch to keep the gate closed or opened, as the case may be.

The operation of my device is as follows: We will suppose that the gate is closed and a vehicle is coming from the road on the left of the gate. The wheels of the vehicle will press down the right-hand trip-rod, which will draw the arm from right to left, at the same time lifting the end of the gate, and the rear portion will be tilted, which will have the effect of inclining and allowing it to open. As the vehicle passes through, its wheel will pass over the right-hand trip-rod, performing the same movement before described, and thus closing the gate. A vehicle coming in the reverse direction would be operated similarly, with the exception that the left-hand trip-rods would be forced down.

Having thus fully described my invention, what I claim, and desire to secure by Letters Patent, is—

1. The combination of the hinge-post A and the latch-posts B C, a lever pivoted to the hinge-post, to which are secured the pintles on which the gate is hung, a crank suitably journaled to the gate-post passing through a projection on said lever, operating devices secured to a bolt adjustable in a slotted terminal arm of said crank, and a gate having brace-rods with nuts on their ends extending diagonally across the same and on each side thereof, all substantially as shown and described.

2. The combination, with a gate, of a lever carrying the hinged pintles interposed between said gate and the supporting-post and pivoted thereon, a crank journaled on said post and passing through the inwardly-turned end of the lever, and operating mechanism adjustably connected to the slotted lower arm of the crank, all substantially as shown and described.

In testimony that I claim the foregoing as my own I affix my signature in presence of two witnesses.

JOHN W. CONDRY.

Witnesses:
JULIUS SOLGER,
C. M. WERLE.